Figure 4:
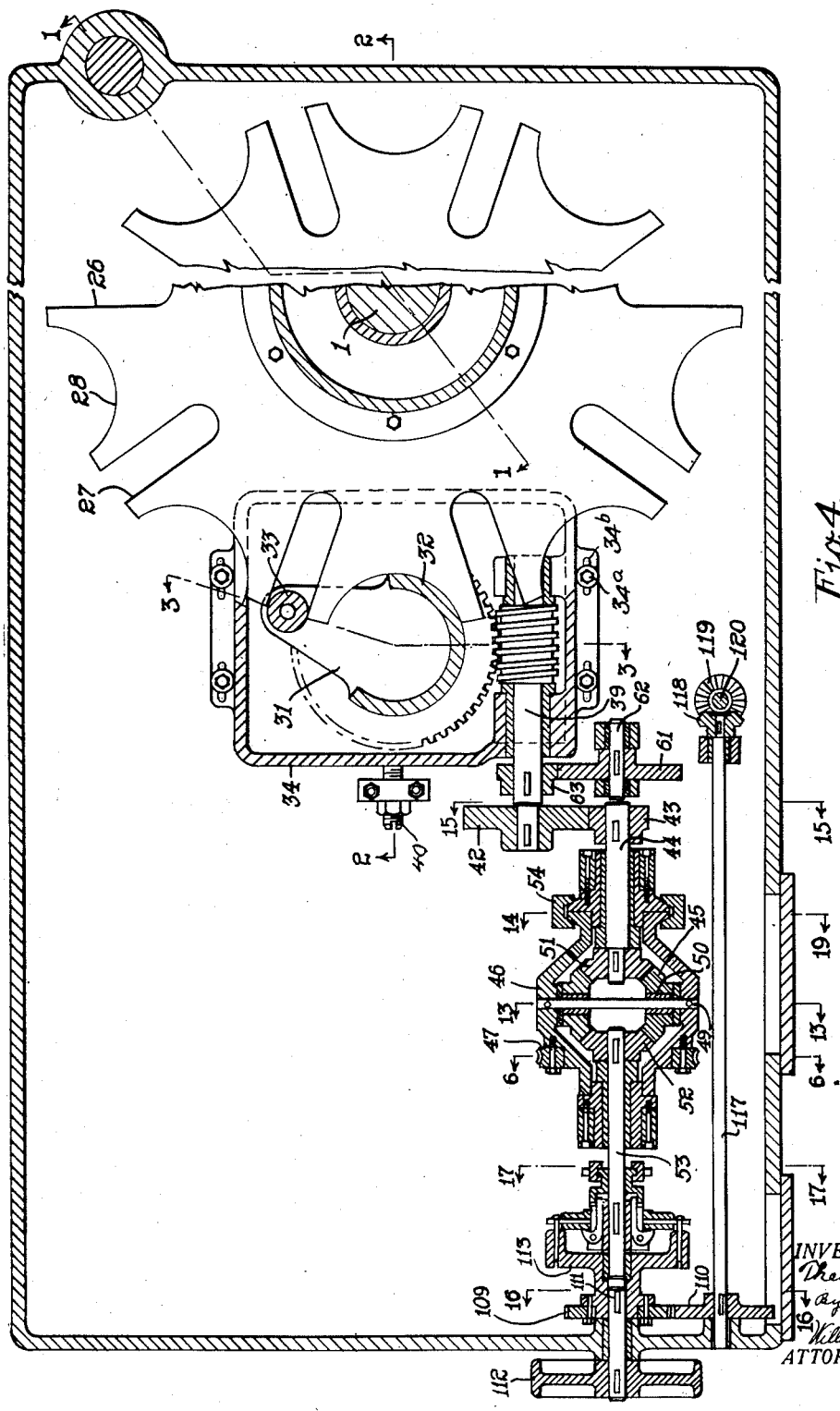

June 10, 1941.    T. H. SLOAN    2,244,809
TUMBLER PRESS
Filed June 25, 1937    6 Sheets-Sheet 1
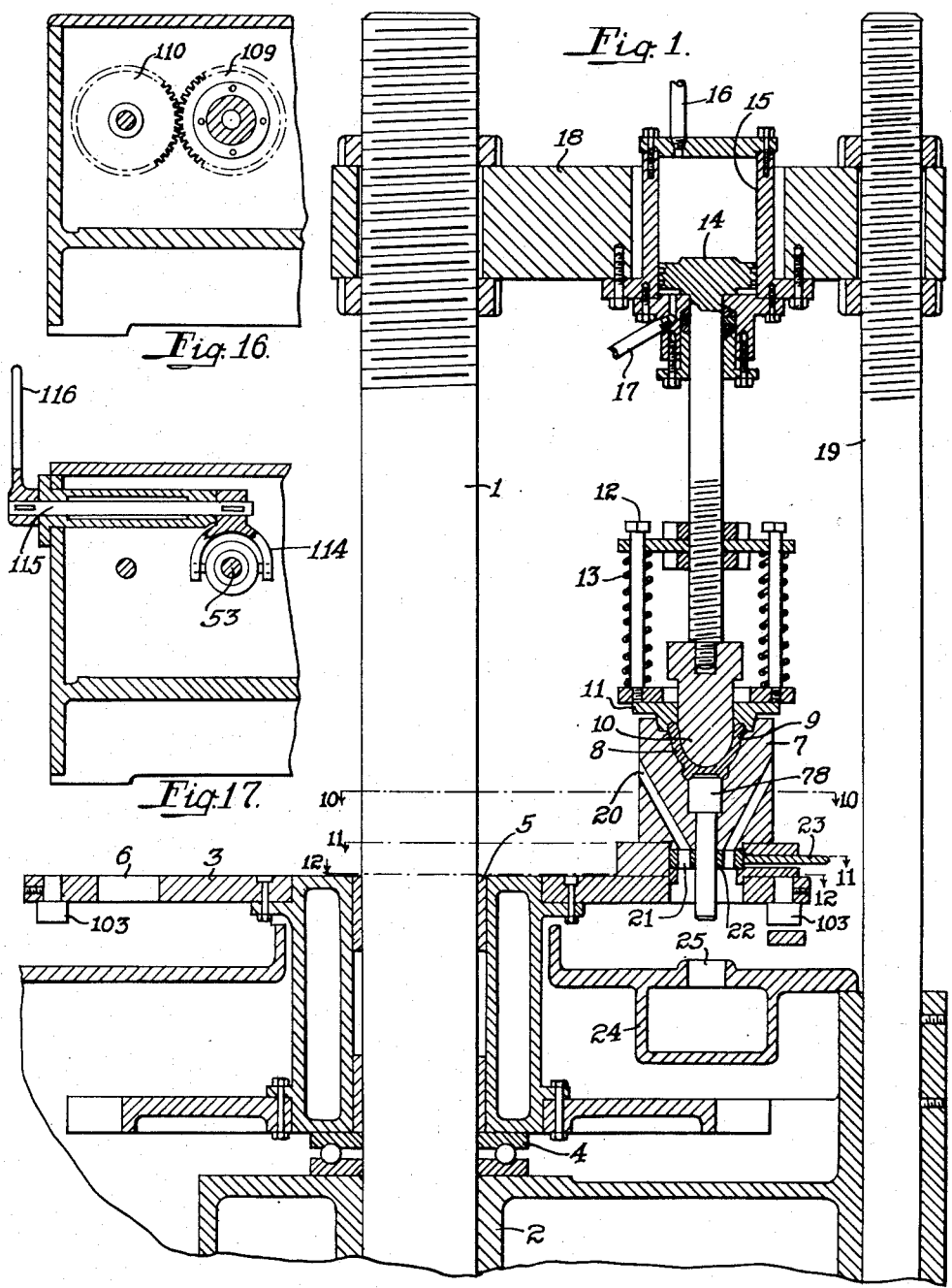
INVENTOR.
Theodore H. Sloan
BY William B. Jaspert
ATTORNEYS.

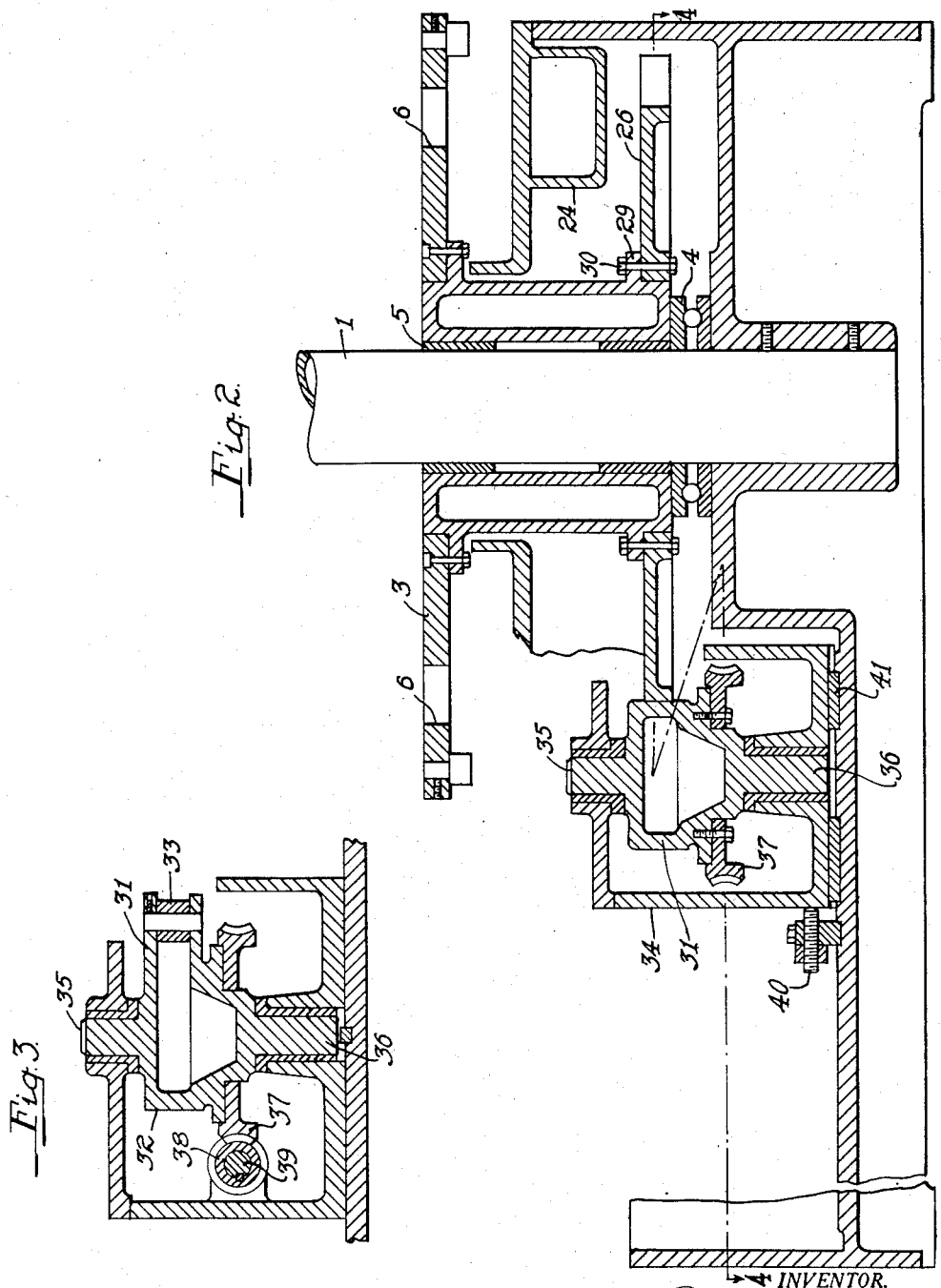

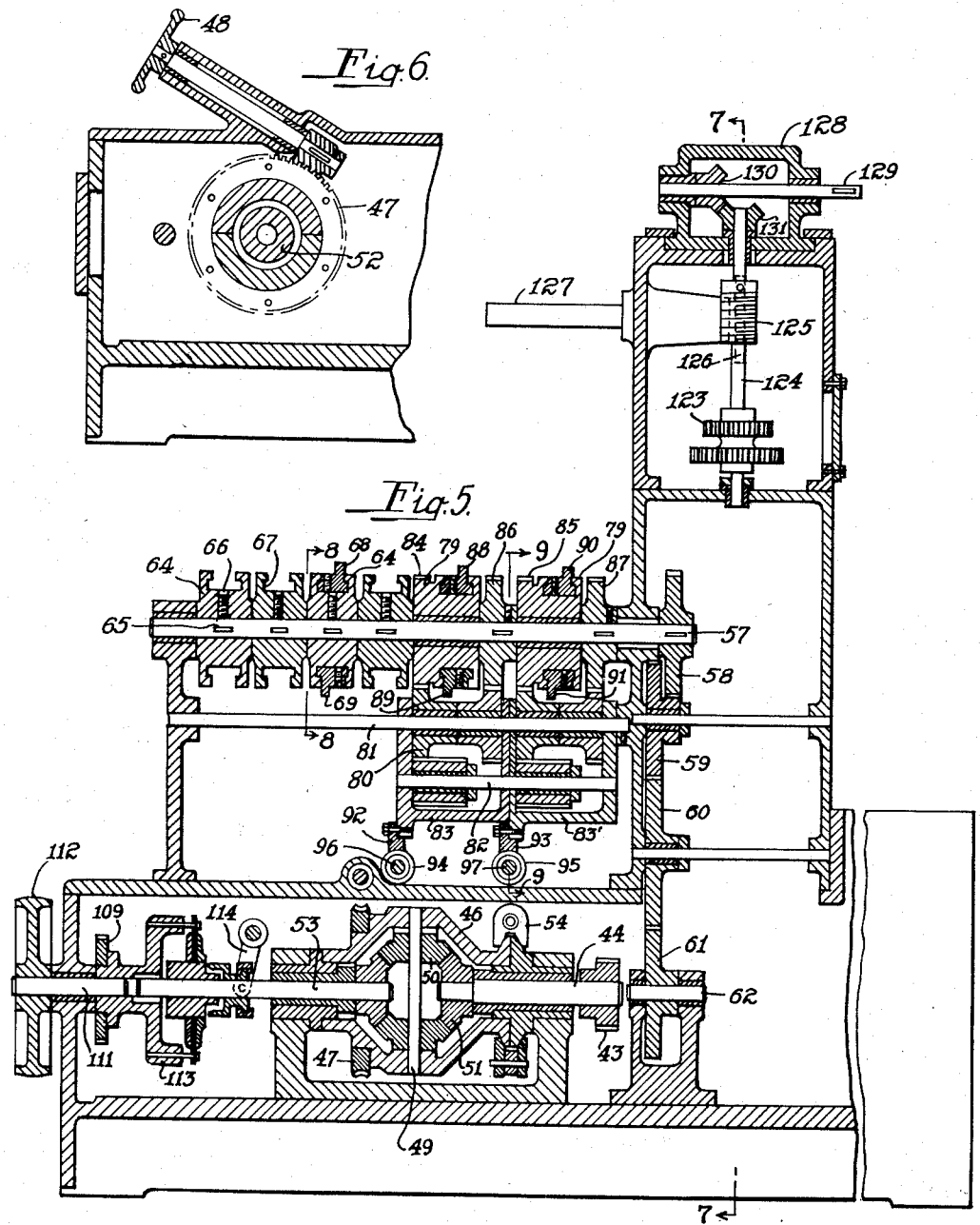

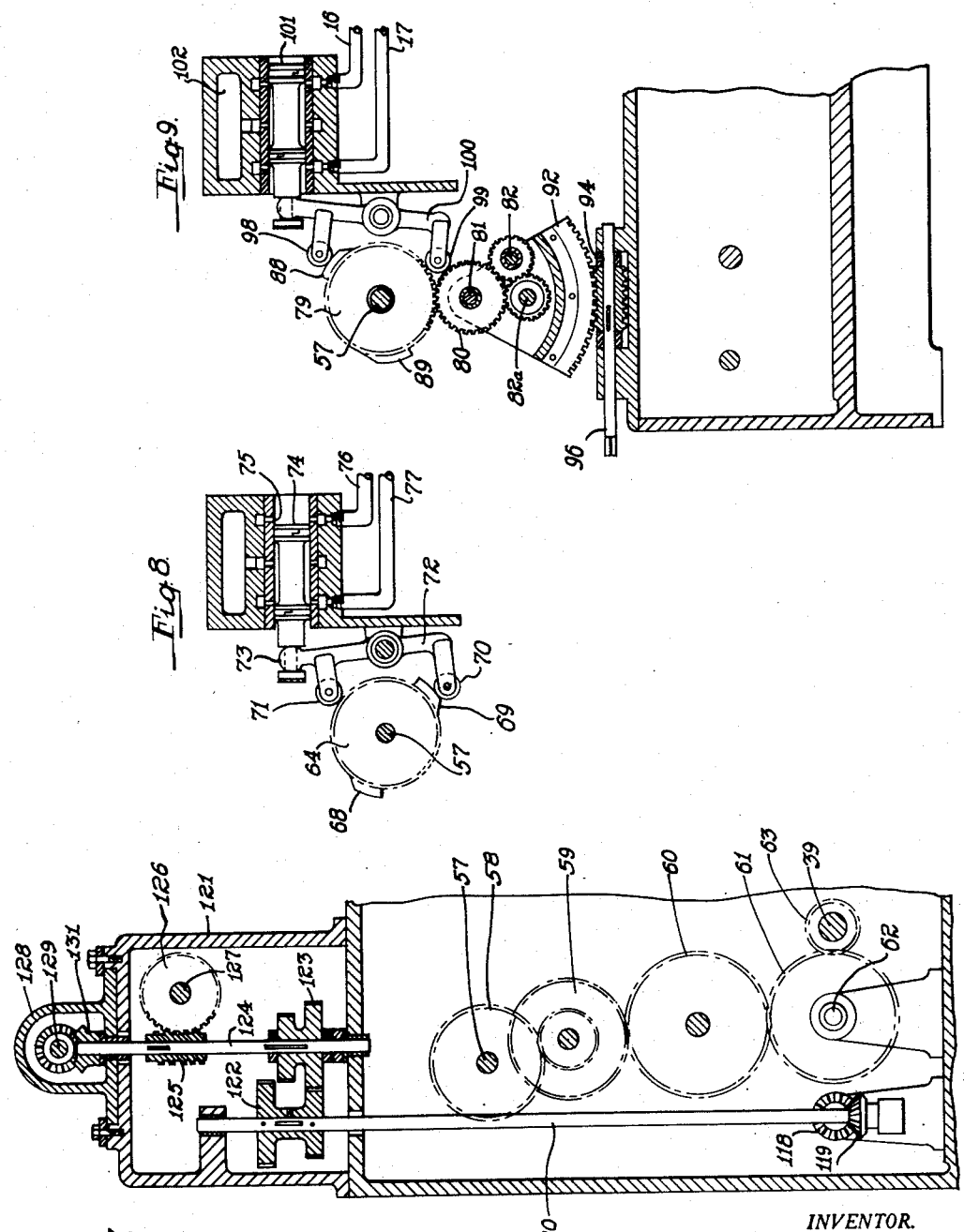

June 10, 1941.  T. H. SLOAN  2,244,809
TUMBLER PRESS
Filed June 25, 1937  6 Sheets-Sheet 6
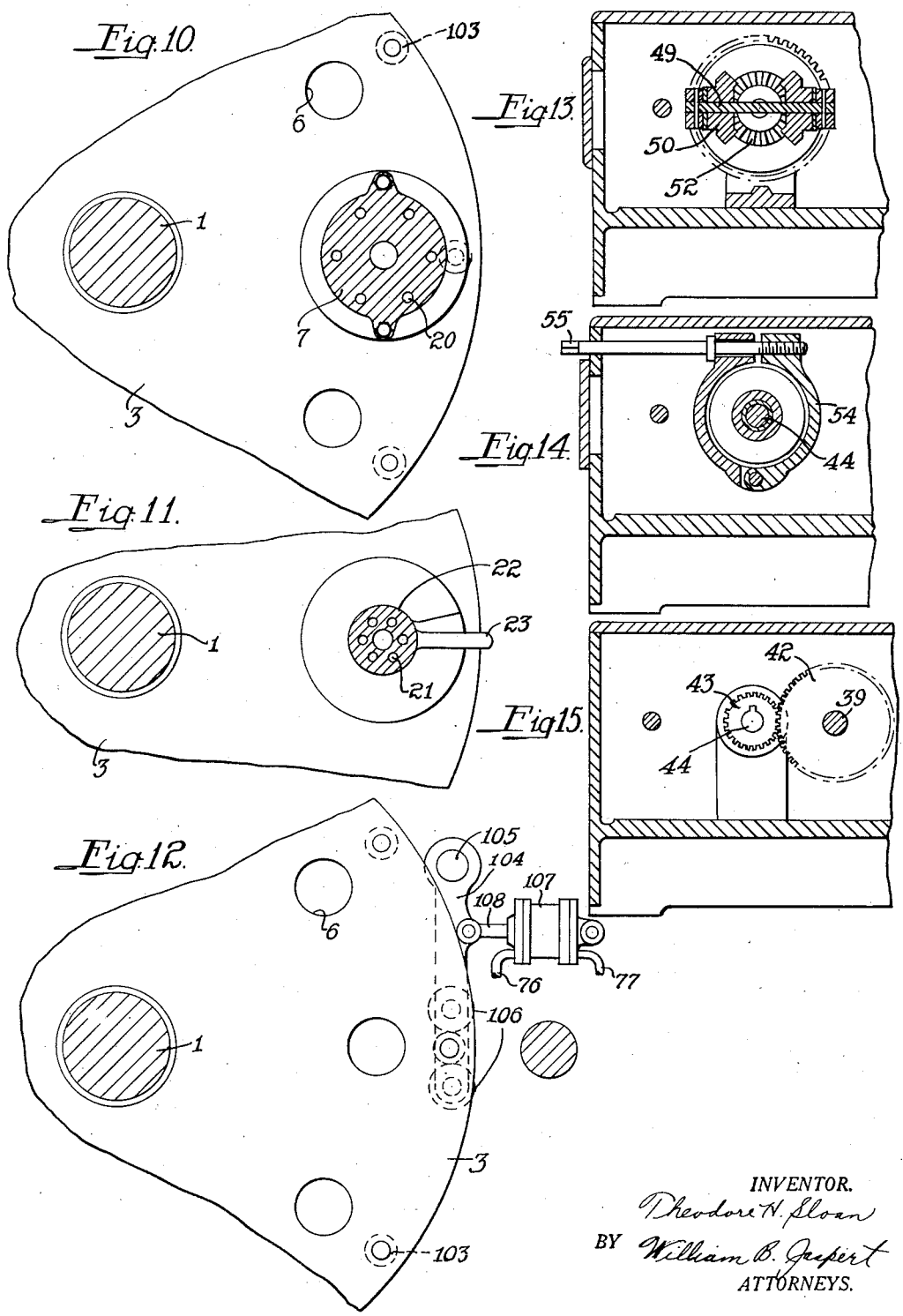
INVENTOR.
Theodore H. Sloan
BY William B. Jaspert
ATTORNEYS.

Patented June 10, 1941

2,244,809

UNITED STATES PATENT OFFICE 2,244,809

TUMBLER PRESS

Theodore H. Sloan, Charleroi, Pa., assignor to G. M. S. Corporation, Pittsburgh, Pa., a corporation of Pennsylvania Application June 25, 1937, Serial No. 150,290

12 Claims. (Cl. 49—38)

This invention relates to ware-forming machines, more particularly to apparatus for pressing glassware, such as tumblers, bowls or the like, commonly referred to in the industry as wide-mouth ware.

It is among the objects of the invention to provide a ware-forming press, in which a plurality of shaping molds are indexed sequentially in alignment with a vertical reciprocating forming plunger, the invention providing means for coordinating the indexing movements of the mold table with the drive mechanism for the glass feeding apparatus, together with means for separately adjusting the indexing movements of the mold table and the feeding impulse of a glass feeder to provide independent regulation thereof.

Another object of the invention is the provision of means for doubling the rate of feeding the glass relative to the indexing movements of the mold table, so that each mold may receive a double charge of glass when extra-large size articles are to be made, without requiring any adjustments or changes of the glass feeder for increasing the mass of the mold charges.

A further object of the invention is the provision of means for obtaining regulable adjustments of the downward movement of the forming plunger, the dwell of the plunger at the end of its ware-forming stroke, and the rate of return or upward movement.

Still a further object of the invention is the provision of means for locking the mold table in position during the formation of the mold charges independently of the indexing mechanism of the mold table.

Still a further object of the invention is the provision of means for cooling the individual molds of the mold table and for regulating the degree of cooling of each mold.

Still a further object of the invention is the provision of means for timing the mechanism for ejecting the ware from the molds, locking the molds, transferring the ware, and other auxiliary operations independently of the means for controlling the indexing movements of the table and independently of controlling the movements of the plunger or the operating mechanism for the glass feeding device.

Further objects of the invention include the provision of novel control and operating mechanisms for coordinating the functions of the various operating parts, as will become more apparent in connection with the description of the accompanying drawings constituting a part hereof in which like reference characters designate like parts and in which:

Fig. 1 is a vertical cross-sectional view of a portion of a ware-forming press embodying the principles of this invention, taken along the line 1—1, Fig. 4;

Fig. 2 a similar view of the base of the apparatus shown in Fig. 1, taken along the line 2—2, Fig. 4;

Fig. 3 is a vertical cross-sectional view of the Geneva drive for the mold table, taken along the line 3—3, Fig. 4;

Fig. 4 horizontal section taken along the line 4—4, Fig. 2;

Fig. 5 a vertical cross-section of the table drive, a vertical section through the air timer, and a vertical section through the feeder drive;

Fig. 6 a cross-section along the line 6—6; Fig. 4;

Fig. 7 a vertical section on the vertical centerline 7—7, Fig. 5;

Fig. 8 a sectional elevational view taken along the line 8—8, Fig. 5;

Fig. 9 a cross-section taken along the line 9—9, Fig. 5;

Fig. 10 a longitudinal section taken along the line 10—10, Fig. 1;

Fig. 11 a similar view taken on the line 11—11, Fig. 1;

Fig. 12 a plan view taken along the line 12—12, Fig. 1;

Fig. 13 a vertical section taken on the line 13—13, Fig. 4;

Fig. 14 a section taken along the line 14—14, Fig. 4;

Fig. 15 a section on the line 15—15, Fig. 4;

Fig. 16 a section taken on the line 16—16, Fig. 4; and

Fig. 17 a section on the line 17—17, Fig. 4.

With reference to Fig. 1 of the drawings, numeral 1 designates the center column of the ware-forming machine, which is rigidly fixed in a base 2, that constitutes a journal for a mold table 3, which is supported on anti-friction bearings 4, and rotates on journals 5. Table 3 is provided with openings 6, above which molds 7 are mounted, the molds having a matrix portion 8, of the shape of the glass or other article to be formed. The numeral 9 designates the shaped article, 10 a plunger for shaping the article to the contour of the matrix 8 of the mold and the contour of the plunger, and 11 a mold ring that shapes the mouth of the article 9 and which is yieldingly suspended by bolts 12 biased by coil springs 13. Plunger 10 is reciprocated by a piston 14, operating in an air cylinder 15, having communication through conduits 16 and 17 with a source of air supply controlled by the machine timer, the conduits alternately functioning as vents in the reciprocating movement of the piston 14. Cylinder 15 is supported by an adustable yoke 18 extending to the center column 1 and to an outer support 19.

The molds 7 are provided with cooling vents 20 angularly spaced, as shown in Fig. 10, through which cooling air is passed upwardly from openings 21 in a disk valve 22, having a handle 23, as shown in Fig. 11. An annular channel 24 supplies low pressure air, which passes through openings 25, against the disk valve 22, thence upwardly through openings 21 into the vents 20 of the molds 7. By manipulating handle 23, more or less air may be caused to pass through the cooling vents 20 of the mold, thus permitting individual regulation of the temperature of the mold 7, which is desirable if, for example, it is necessary to change part of the set of molds during the operation of the machine.

The mold table is rotated at intervals by a Geneva drive, shown in Figs. 2, 3 and 4, which consists of a Geneva wheel 26, having a plurality of radial slots 27, and a similar number of concave surfaces 28, the wheel being mounted on a flange 29 of the mold table by bolts 30, as shown in Fig. 2, and there are as many slots and concave surfaces 27 and 28, respectively, as there are molds on the table. The wheel is actuated by a driver 31, having a concentric surface 32 that engages the concave surfaces 28 of the wheel and which carries a roller 33 for engaging the slots 27 of the wheel. For each turn of the driver 31, the roller 33 engages one of the slots 27, turning the wheel 26 a fraction of a revolution, and the concentric surface 32 of the driver engages the concave surface of the wheel before the driving roller 33 is disengaged from the slot 27, which prevents the wheel from rotating while the roller 33 is moving around to engage the next successive slot. The driver 31 is journalled in a housing 34, Figs. 2 and 3, by spindles 35 and 36, and a worm gear 37 interacts with a worm 38 mounted on shaft 39, Figs. 3 and 4. The entire driver housing 34 is adjustable relative to the Geneva wheel 26 by an adjusting screw 40, the housing being mounted on slides 41, as shown in Fig. 2 of the drawings, and the housing 34 is secured by bolts 34a in slots 34b of side flanges, Fig. 4, in adjusted position.

The worm shaft 39 is actuated by means of the following mechanism: A gear wheel 42, Fig. 4, interacts with the teeth of a pinion 43 keyed to shaft 44, driven through a differential gear mechanism, generally designated by the numeral 45. The differential comprises a casing 46, provided with a worm wheel 47, which may be rotated by a hand wheel 48, as shown in Fig. 6. The casing 46 carries a spindle 49 on which beveled gears 50 are mounted. The gears 50 interact with the teeth of bevel gear 51, keyed to shaft 44, and a bevel gear 52 keyed on shaft 53. A brake band 54 is adapted to engage the casing 46, as shown in Fig. 4, and the brake band may be loosened or tightened by a shaft 55, shown in Fig. 14. The operator, by rotating shaft 55, Fig. 14, to release the brake 54, may then adjust hand wheel 48, Fig. 6, to turn the casing 46 in either direction. If the casing is revolved in the direction of rotation of shaft 44, it will subtract one revolution from shaft 44 for every turn of the casing 46. If the casing is turned in the opposite direction, it will add one revolution to shaft 44 for each turn of the casing. In this manner, all the machine functions may be advanced or retarded in relation to the timing of the feeder.

Other operations such as must be coordinated with the mold table movements are controlled through the mechanism, shown in Fig. 5, which consists of a timer shaft 57 connected by gears 58, 59, 60 and 61, the latter being mounted on a stud shaft 62 to a pinion 63, Fig. 4, of the worm shaft 39 of the Geneva drive. This train of gearing is also shown in Fig. 7 of the drawings. On timer shaft 57, a number of cam holders 64 are secured by keys 65 and set screws 66. The cam holders are provided with T-slots 67, in which are mounted adjustable cam points 68 and 69, two of such being shown for illustration only. Cam point 68 comes to the right of the centerline of the cam holder and 69 to the left of the centerline of the cam holder, so that the offset points will only engage certain rollers, as shown in Fig. 8, for example, in which the cam point 69 is shown engaging roller 70, while cam point 68 will engage roller 71, as shaft 57 rotates. Rollers 70 and 71 are mounted on a timer valve operating lever 72, which has a bifurcated end 73 in engagement with a valve rod of a spool type valve 74 that controls ports 75, etc. of a source of air supply which communicates through conduits 76 and 77 with such mechanism as the ware-ejector 78, Fig. 1, or the mold lock shown in Fig. 12, the operation of which will be hereinafter explained. Each of the fixed cam holders of the timer shaft performs such a function through valve mechanism, as shown in Fig. 8.

The plunger movement is controlled by cam holders 79, Fig. 5, which are rotatably mounted on shaft 57 and not fixed thereon, as are the cam holders 64. These rotatable cam holders are controlled by planetary gearing generally designated by the numeral 80, journalled on a fixed shaft 81, and at the bottom of the planetary case are two fixed shafts 82 and 82a within the housing 83. The planetary gearing drives the cam holders through gear teeth 84 and 85, cut on the sides of the holders 79, the planetary gears being driven through gear wheels 86 and 87, fixed to rotate with the timer shaft 57. Cam points 88 and 89 control the downward movement of the plunger 10, and cam points 90 and 91 control the upward movement of the plunger 10. The position of the cam holders 79 may be altered by the operator by rotating the planetary gear housing 83 and 83', through segments 92 and 93, that interact with worms 94 and 95, rotatable by shafts 96 and 97 in the manner shown in Fig. 9 of the drawings. The cam points 88 engage rollers 98, Fig. 9, and cam points 89 engage rollers 99, Fig. 9, mounted on timer valve operating lever 100 that actuates a spool valve 101, to control the application of fluid pressure from a source 102 to the operating cylinder 15 of the plunger, to which the pressures are communicated through conduits 16 and 17, Figs. 1 and 9. By the adjustments of the cam points for the plunger control, the reciprocating movements as well as the dwell of the plunger, when in the down position, as shown in Fig. 1, may be controlled at will, to advance or retard the functions of the plunger in relation to the table movement while the machine is in operation.

In the operation of the ware-molding press, the Geneva wheel is not relied upon to lock the position of the mold table in register with the plunger 10. For this purpose, steel studs 103, Figs. 1 and 12, are provided beneath the mold table 3, of the same number and spacing as the mold stations 6, this being shown in Fig. 12. An arm 104, pivoted on a stud 105 on the frame of the press, is provided with two rollers 106, the spacing between the rollers being such as to not quite pass over the steel studs 103 of the table. Lever 104 is actuated by a fluid pressure cylinder 107, connected to a timer mechanism, such as shown in Fig. 8, through conduits 76 and 77. A piston rod 108 connects the lever 104, and when the table 3 is indexed to the molding position, the lever 104 snaps to the position shown in Fig. 12, with its rollers 106 intimately engaging the stud 103, thereby securely locking the table during the shaping operation. Upon retraction of the forming plunger, lever 104 is retracted to disengage the stud and permit free indexing of the table.

As it is desirable to control the operations of the forming press independently of the feed mechanism, and yet provide means for coordinating the movements of the press and feeder, the feeder drive is connected to the press drive through gear wheels 109 and 110, Fig. 4 of the drawings, gear 109 being keyed to a drive shaft 111, having a pulley 112, which is driven by a motor in any suitable manner. Gear wheel 109 is mounted on the hub of a clutch mechanism 113, whereby the drive shaft 111 is coupled to the shaft 53 of the differential gear mechanism; the clutch is actuated by a yoke 114 mounted on a shaft 115 that is turnable by a lever 116 in the manner shown in Fig. 17. Fig. 16 is an end view of the gear drive 109 and 110.

The feeder mechanism drive consists of the aforementioned gear wheels 109 and 110, the latter being keyed on a shaft 117, having a beveled gear 118 secured thereto, which interacts with the teeth of a beveled gear 119 of a vertical shaft 120, Figs. 4 and 7 of the drawings, which extends through the upper machine frame, into a transmission housing 121. Shaft 120 is provided with change gears 122 and 123 which may be changed to double the speed of a driven shaft 124 that carries a worm 125 interacting with a worm wheel 126 on a shaft 127, which is more clearly shown in Fig. 5 of the drawings, shaft 124 extending upwardly into a housing 128 containing a feeder drive shaft 129, which is geared to shaft 124 through miter gears 130 and 131.

The gear reduction to shaft 127 is such that the latter will turn once for each index of the mold table, and shaft 127 is employed to drive a mechanical feeder such as the plunger type and shaft 129 is the feeder drive connection when an air or vacuum feed is employed.

By changing stack gears 122 and 123, Fig. 7, shaft 127 can be rotated to either feed a single gob to the mold for each index of the mold table, or two gobs may be fed to each mold, where large-size ware is made.

The herein-described mechanism operates briefly as follows: Referring to Figs. 4 and 5 of the drawings, when shaft 111, which is the motor driven shaft, is actuated, both the clutch mechanism 113 and the feeder drive shaft 117 will be actuated. By disengaging clutch 113 through lever 116, the feeder may continue to operate while the forming press stands idle. When, however, clutch 113 is engaged, both the feeder and the forming press will be operative, and if the forming press is out of time with the feeding of the glass charge, brake 54 is released by turning shaft 55, Fig. 14, and casing 46 may then be rotated in either direction by hand wheel 48, Fig. 6, to advance or retard the speed of shaft 44 to advance or retard the Geneva drive 31.

Separate adjustment of the plunger is attainable by movement of the planetary housings 83 and 83' through rotation of shafts 96 and 97, as shown in Fig. 9 of the drawings. These adjustments of the planetary system, as previously explained, control the downward and upward movement, and also the length of dwell of the plunger at the completion of its downward or ware-forming movement.

It is apparent that all these adjustments can be made without interrupting the operation of either the feeder or forming machine or both, to thereby attain maximum production of the ware-forming press without interference with the auxiliary feeding equipment.

Although one embodiment of the invention has been herein illustrated and described, it will be obvious to those skilled in the art that various modifications may be made in the details of construction without departing from the principles herein set forth.

I claim:

1. In a ware-forming machine, a rotary mold table, a reciprocating plunger therefor, indexing means for said table for successively bringing the molds in alignment with the plunger, and means independent of and coordinating with said indexing means for locking the table with the molds in register with the plunger, said table locking means comprising a plurality of studs on said mold table corresponding in number to the mold stations of the table, and a reciprocating lever having a pair of spaced rollers for engaging the studs therebetween, the spacing of the rollers being slightly less than the diameter of said studs.

2. In a ware-forming machine, a rotary mold table, a reciprocating plunger therefor, indexing means for said table for successively bringing the molds in alignment with the plunger, said indexing means comprising a Geneva wheel and a driver therefor, said driver being mounted for sliding movement to adjust the position of the driver relative to the wheel, and a spur gear transmission for the driver shaft having meshing gear teeth in parallel alignment with the axis in which the driver is movable when adjusted relative to the Geneva wheel.

3. In a ware-forming machine, a rotary mold table, a reciprocating plunger therefor, indexing means for said table for successively bringing the molds in alignment with the plunger, a drive mechanism for said mold table, an air motor for said plunger and means controlling the application of air to said plunger motor, a differential gear transmission for said table drive and a second differential gear transmission for said plunger controlling means, said last-named transmission being operable by the first-named transmission and being adjustable to regulate the speed of the plunger independently of the table speed.

4. In a ware-forming machine, a rotary mold table, a reciprocating plunger therefor, indexing means for said table for successively bringing the molds in alignment with the plunger, a drive mechanism for said table including a differential gear transmission, a timer shaft operable by said table drive, an air motor for actuating the forming plunger, cams mounted on the timer shaft controlling the application of fluid pressure to said plunger motor, a differential gear transmission actuated by the timer shaft for rotating said cams, and means for varying the relative speeds of the cams and timer shaft.

5. In a ware-forming machine, a rotary mold table, a reciprocating plunger therefor, indexing means for said table for successively bringing the molds in alignment with the plunger, a gear transmission for driving said table, fluid pressure means for actuating the shaping plunger, cam mechanism controlling the application of fluid pressure to the plunger in the downward movement of the plunger, cam mechanism for controlling the application of fluid pressure for the upward movement of the plunger, said cam mechanism being actuated by the table drive mechanism, and means for varying the speeds of rotation of the cam mechanisms independently of the table drive mechanism and relative to each other to thereby vary the rate of the reciprocating plunger movements.

6. A ware-forming machine comprising a rotary mold table, having molds angularly spaced, a reciprocating plunger in alignment with the path of movement of the molds, indexing means for successively aligning the molds with the plunger, an air motor for actuating said plunger, drive mechanism for said indexing means and cam-operated valve mechanism controlling the application of fluid pressure to said plunger motor, said cam mechanisms being actuated by the indexing drive means, and means for varying the speed of rotation of said cams to thereby vary the plunger movements independently of the indexing movements of the table, said means being operative to separately control the rate of downward and upward movement of the plunger and to control the dwell of the plunger at the end of its movements.

7. Ware-forming apparatus comprising a rotary mold table, a reciprocating plunger, drive mechanism including indexing means for successively aligning the molds of the table with said plunger, locking mechanism for said mold table, fluid pressure means for actuating said plunger and fluid pressure means for actuating the table locking mechanisms including fluid control valves, means controlling said fluid pressure means comprising a timer shaft, a plurality of fixed cams mounted on said shaft for actuating the valves of said locking means, a pair of cams on said timer shaft mounted for rotation independently of said timer shaft, planetary gears for rotating said cams operatively connected to be actuated by the timer shaft, said cams controlling the application of fluid pressure to the reciprocating plunger, and means including said planetary gearing for differentiating the speeds of said pair of cams to thereby independently control the downward and upward plunger movements.

8. A drive mechanism for a ware-forming machine comprising a table drive, a plunger drive and a feeder drive, a common actuator for said drives, means for varying angular movement of the table drive independently of the feeder drive, and means for varying the speed of the plunger movements independently of said table or feeder speeds during the continuous operation of said respective drive mechanisms.

9. A drive mechanism for a ware-forming machine comprising a table drive, a plunger drive and a feeder drive, a common actuator for said drives, a differential gear mechanism for varying angular movement of the table drive, a second differential gear mechanism for varying the rate of the plunger movements, and means for regulating said differential mechanisms independently of each other and independently of the feeder drive mechanism.

10. In a ware-forming machine, a drive mechanism and fluid pressure actuating mechanism including a valve, an actuating arm for said valve, a pair of rollers on said arm, a cam having a plurality of cam points for engaging said rollers, differential gear mechanism for rotating said cams, and means for varying the speed of rotation of the cams independently of the ware-forming machine drive mechanism.

11. In a ware forming machine, a drive mechanism and fluid pressure actuating mechanism including a plurality of valves, actuating arms for each valve, a pair of rollers on each of said actuating arms, pairs of discs having adjustable cam points for actuating the rollers of one valve actuating arm alternately in timed relation, an axis for the valve actuating arm and means for oscillating the said arm and valve which includes the cam points, a drive shaft for rotating the discs in unison, differential gear mechanism for rotating some of said discs on the drive shaft relative to the others thereof, and means to adjust the said differential gear mechanism whereby the relativity of the fluid pressure valve actuating mechanisms is varied.

12. In a glass forming machine, a rotary mold table having a plurality of angularly spaced molds, a reciprocating forming plunger drive mechanism including indexing means for successively moving the molds into alignment with the plunger, valves controlling the timed operations of the forming machine, timing means comprising a timer shaft driven by the table indexing drive means, a plurality of cams for controlling some of the operating valves, said cams being mounted on said shaft to rotate therewith, a plurality of cams mounted for rotation on said timer shaft for controlling others of said operating valves, planetary gears driven by the timer shaft for rotating said last named cams, and means for adjusting said planetary gears to differentiate the speeds of said first and last named cams.

THEODORE H. SLOAN.